3,349,079
GEL FORMING ALGINATE PRODUCTS AND METHOD OF PRODUCING THE SAME
John C. Freedman, La Mesa, Calif., assignor to Kelco Company, San Diego, Calif., a corporation of Delaware
No Drawing. Filed Apr. 6, 1964, Ser. No. 357,769
17 Claims. (Cl. 260—209.6)

This invention relates to new and useful heat resistant gel-forming alginates and a method of producing said products.

The formation of aqueous gels by means of calcium alginates is known. Thus, for example, methods for producing such gels are disclosed in U.S. Patent 2,420,308, issued May 13, 1947; and U.S. Patent 2,808,337, issued Oct. 1, 1957. These patents are assigned to applicant's employer the Kelco Company, of San Diego, Calif., and it is to the improvement of the alginate gels disclosed therein that the instant invention is directed. It is known, as aforesaid and as is shown in the aforementioned patents, that aqueous water soluble alginates may be converted into alginate gels by the addition of certain calcium salts. The procedures for producing aqueous alginate gels that have heretofore been used include preparing an algin composition adapted to form a gel when added to water, said algin composition comprising a finely ground calcium alginate in admixture with a finely ground water soluble alginate. Still other alginates for producing aqueous gels include mixed sodium and calcium alginate salts prepared by reacting alginic acid with an excess of a sodium salt and thereafter reacting the resulting sodium alginate with a calcium salt. It is also known to convert fibrous solid alginic acid to water soluble alginates as disclosed in U.S. Patent 2,477,861, issued Aug. 2, 1949, and to form alginate gels from aqueous solutions of alginates so produced by the addition of calcium salts.

Aqueous alginate gels produced by the foregoing are useful commercial products for many purposes. However, such products lose viscosity to a substantial degree when subjected to a use environment having elevated temperatures of the order of 200° F. and greater.

It is an object of this invention to provide an alginate that will produce heat resistant aqueous gels.

It is another object of this invention to provide a new alginate that will produce heat resistant aqueous gels at relatively low level concentrations of the said alginate.

It is still another object of this invention to provide a method for producing useful alginate products.

It is an additional object of this invention to provide an alginate that will produce relatively tasteless heat resistant aqueous gels at low levels of concentration of the said alginate.

Still other objects will appear from the disclosure of my invention to follow.

Surprisingly, in accordance with my invention I have found that an alginate encompassing one or more of the aforementioned objectives will result from first reacting a calcium source as more particularly hereinafter set forth with alginic acid in the presence of a lower aliphatic alcohol and thereafter further reacting the calcium alginate so produced with a material that will form a water soluble alginate such as a sodium salt. In order to produce an alginate suitable for use in accordance with my invention, the said alginate should have from .25 to .45 equivalent of calcium reacted per one equivalent of alginic acid, the remaining equivalent, i.e., .55 to .75, being substantially all reacted with a material that will form a water soluble salt with alginic acid such as sodium, potassium, or ammonia. More particularly in accordance with my invention wet alginic acid at about 20% solids is slurried with isopropyl alcohol, preferably to give a 50—50 water-alcohol mix. The preparation of wet alginic acid, per se, is well known to those skilled in the art and is disclosed, for example, in U.S. Patent 1,814,981 to Thornley and Walsh. To the slurry prepared as aforesaid I add, for example, calcium carbonate in an amount that will neutralize 35% of the alginic acid and mix thoroughly for about 20 minutes. To the resulting admixture I then add a sufficient quantity of sodium bicarbonate to neutralize the remaining 65% of said acid and continue mixing for 20 minutes to give a neutral pH. Following the completion of the mixing of the aforementioned ingredients I press the alcohol-water from the resulting fibrous product. The product is then dried for 1½ hours at 120° F. in a tray dryer. Thereafter the resulting dried product may be milled to about 60 mesh in a Wiley mill. The product resulting therefrom as will be shown later herein will produce alginate gels having increased heat resistance and other desirable properties.

In the foregoing example of the method of my invention I have used calcium carbonate as the calcium source. Other calcium sources may be used but the use of calcium carbonate gives a superior product to one produced with, for example, calcium chloride. Calcium hydroxide and calcium acetate also produce suitable alginates in accordance with my invention. Concerning the alcohol that I use in my method the alcohol should be a water miscible alcohol such as methyl, ethyl, and isopropyl alcohol. I prefer isopropyl alcohol.

The material that will form a water soluble salt of alginic acid used in the above example of my invention as may be noted is sodium bicarbonate. Other suitable materials include sodium sources as well as sources of potassium and ammonia that will produce water soluble alginates. Thus, for example, sodium hydroxide, potassium hydroxide, ammonium hydroxide, ammonium carbonate, and sodium carbonate. The preferred material for use in accordance with my invention is sodium bicarbonate.

Concerning the amount of the reagents used in my method, it is preferable to use an amount of alcohol substantially equal to the water content of the wet alginic acid. Larger amounts are wasteful and quantities of alcohol lower than a ratio of about 35 parts of alcohol by volume to 65 parts of water by volume will impede the formation of the alginate products desired in accordance with my invention. In the foregoing example of my invention I reference a wet alginic acid containing about 20% solids. In accordance with my invention I may use an alginic acid containing from about 10% to 40% solids depending on the viscosity of the material. I prefer to use a wet alginic acid having 15% to 30% solids. I find that the calcium salt should be present in an amount that will result in a .25 to .45 equivalent of calcium reacted per one equivalent of alginic acid and I prefer an amount that will result in .30 to .35 equivalent of calcium reacted per one equivalent of alginic acid. Concerning the sodium or other cation used in accordance with my invention to react with the remaining equivalents of the said alginic acid I use an amount of such a cation source so that from .55 to .75 of said remaining equivalents will be substantially all reacted. I prefer to use with the aforementioned preferred amount of calcium, i.e., .30 to .35, an amount of a cation source that will result in .70 to .65 equivalent of said alginic acid being reacted with sodium or other cation that will produce a water soluble alginate.

In order to demonstrate the effectiveness of products prepared in accordance with my invention, I prepared an aqueous solution at a 1% by weight concentration of the dried milled 60-mesh product referred to in the foregoing. This product was tested on a Brookfield Model L.V.F. viscometer with a number 4 spindle at 60 r.p.m. The initial viscosity was 5300 cps. The gel so produced was then heated for 2 hours at 200° F. It was again tested on the said Brookfield viscometer and had a viscosity of 5800 cps. Additional samples of alginates prepared in accordance with my invention were made in keeping with the foregoing in which the said samples were prepared with ammonium hydroxide and sodium hydroxide respectively instead of the sodium bicarbonate referred to in the example. The amounts of these reagents used was the same, i.e., an amount sufficient to react with .65 equivalent of alginic acid. The resulting products were likewise dried and milled to 60 mesh in a Wiley mill. A 1% aqueous solution prepared with the material made with ammonium hydroxide had an initial viscosity of 6300 cps. when tested as aforesaid on a Brookfield viscometer. The resulting gel after heating for 2 hours at 200° F. had a viscosity of 4300 cps. The product with sodium hydroxide had an initial 1% viscosity of 4300 and a 1% viscosity after 2 hours at 200° F. of 3300.

I repeated the foregoing experiments using a commerical product sold by the Kelco Company in San Diego, Calif., under the trademark Keltose. This product is an admixture of ammonium alginate and calcium alginate as described in U.S. Patent 2,420,308. In all instances my new products give more than three times as much viscosity at 1% concentrations as said Keltose. Still further ½% solutions of my new products had more viscosity than 1% solutions of the said product known as Keltose. In a further elevated temperature test at 250° F. for 40 minutes, a new alginate made in accordance with my invention and employing calcium carbonate and sodium bicarbonate maintained a viscosity of 6700 cps. An alginate gel prepared with the same quantity of Keltose (a product made in San Diego, Calif., by the Kelco Company) had a viscosity of only 240 cps. after being subjected to the aforementioned elevated temperature test at 250° F. for about 40 minutes. Aqueous gels made with alginates prepared by first reacting a sodium salt with alginic acid and thereafter reacting the resulting product with a calcium salt as taught in United States Patent 2,808,337 are likewise not comparable in heat resistant properties to aqueous gels prepared with my new alginates.

In view of the foregoing, it will be appreciated by those skilled in the art that I have produced new and useful alginates and particularly alginates that will form gels of very high viscosities in aqueous solutions at relatively low concentrations and gels that have good heat stability. My alginates will be found useful in hot calender sizing solutions in the paper industry.

In producing a plant run of alginates in accordance with my invention it will be found desirable to use an alginic acid which when neutralized with ammonia tests 700 to 1200 cps. at 1% concentration and which has an ash content up to about 2.5%. The alginic acid should be put in a suitable mixer and an amount of isopropanol about equal to the water present added. For each 100 pounds of alginic acid (anhydrous basis), 7.5 pounds of calcium carbonate should be aded first and the slurry mixed at least 20 minutes. Thereafter, 28 pounds of dry sodium bicarbonate should be added for each 100 pounds of acid, and mixed for about 15 minutes. If the pH is not in the range 6.0–9.0 it should be adjusted with additional sodium bicarbonate. The resulting product should then be extruded to remove water and alcohol. The extruded product should be dried and milled to be a desired mesh.

The uniform mixed alginic acid salts that I prepare in accordance with my invention have a relatively uniform molecular distribution of calcium therein. To produce such salts it is essential that the alginic acid first be reacted with the calcium source and thereafter with the water soluble cation source, e.g., sodium, and in the quantities specified herein.

While I have described my invention with aid of various specific ingredients, concentrations, treating conditions, and the like, it will be apparent that within the board scope of the invention as defined by the claims which follow, I may make numerous variations of detail, working conditions, and the like.

I claim:

1. An alginic acid salt capable of forming a heat resistant aqueous gel, said salt having .25 to .45 equivalent of calcium reacted per equivalent of alginic acid, the remaining .55 to .75 equivalent of said acid being substantially all reacted with a material that will produce a water soluble salt when reacted with alginic acid.

2. An alginic acid salt capable of forming a heat resistant aqueous gel, said salt having .25 to .45 equivalent of calcium reacted per equivalent of alginic acid, the remaining .55 to .75 equivalent of said acid being substantially all reacted with a sodium source.

3. An alginic acid salt capable of forming a heat resistant aqueous gel, said salt having .25 to .45 equivalent of calcium reacted per equivalent of alginic acid, the remaining .55 to .75 equivalent of said acid being substantially all reacted with a potassium source.

4. An alginic acid salt capable of forming a heat resistant aqueous gel, said salt having .25 to .45 equivalent of calcium reacted per equivalent of alginic acid, the remaining .55 to .75 equivalent of said acid being substantially all reacted with an ammonium source.

5. An alginic acid salt capable of forming a heat resistant aqueous gel, said salt having .25 to .45 equivalent of calcium reacted per equivalent of alginic acid, the remaining .55 to .75 equivalent of said acid being substantially all reacted with sodium bicarbonate.

6. An alginic acid salt capable of forming a heat resistant aqueous gel, said salt having .25 to .45 equivalent of calcium reacted per equivalent of alginic acid, the source of the said calcium being calcium carbonate, the remaining .55 to .75 equivalent of said acid being substantially all reacted with sodium bicarbonate.

7. A dry comminuted alginic acid salt capable of forming a heat resistant aqueous gel, said salt having .30 to .35 equivalent of calcium reacted per equivalent of alginic acid, the remaining .65 to .75 equivalent of said acid being substantially all reacted with a cation source that will produce a water-soluble salt when reacted with alginic acid.

8. The process of producing an alginic acid salt capable of forming a heat resistant aqueous gel, said process comprising suspending wet alginic acid in a water miscible alcohol, first admixing therewith an amount of calcium carbonate that will neutralize 35% of the alginic acid, and thereafter adding a sufficient quantity of sodium bicarbonate to the said resulting mixture to neutralize substantially all of the remaining 65% of said alginic acid.

9. The process of claim 8 in which the wet alginic acid has approximately 20% solids.

10. The process of claim 8 in which the alcohol is isopropyl alcohol.

11. The process of claim 8 in which the volume of alcohol present is in an amount substantially equal to the water content of the said acid.

12. The process of claim 8 in which the alcohol and water is removed from the resulting product and the said product dried at a temperature in excess of atmospheric temperature.

13. A heat resistant aqueous gel containing water and the alginic acid salt defined in claim 1.

14. A heat resistant aqueous gel containing water and the alginic acid salt defined in claim 2.

15. A heat resistant aqueous gel containing water and the alginic acid salt defined in claim 5.

16. A heat resistant aqueous gel containing water and the alginic acid salt defined in claim 6.

17. The process of producing an alginic acid salt which is capable of producing a heat resistant aqueous gel, said process comprising suspending wet alginic acid in a water miscible alcohol, first admixing therewith a calcium source in an amount sufficient to neutralize from 25 to 45% of said alginic acid, and thereafter adding a material which is capable of producing a water soluble alginic acid salt when reacted therewith, said material being present in an amount to neutralize the remaining 55 to 75% of said alginic acid.

References Cited

UNITED STATES PATENTS

| | | | |
|---|---|---|---|
| 2,441,729 | 5/1948 | Steiner | 260—209.6 |
| 2,477,861 | 8/1949 | Clark et al. | 260—209.6 |
| 2,808,337 | 10/1957 | Gibsen | 260—209.6 |

DONALD E. CZAJA, *Primary Examiner.*

LEON J. BERCOVITZ, *Examiner.*

R. W. MULCAHY, *Assistant Examiner.*